Sept. 5, 1944.　　P. SUBKOW ET AL　　2,357,617
GEOMETRICAL DETERMINATION OF DIP AND STRIKE OF CORED STRATA
Filed Feb. 1, 1943　　4 Sheets-Sheet 1

PHILIP SUBKOW,
LYLE DILLON,
INVENTOR.

ATTORNEY.

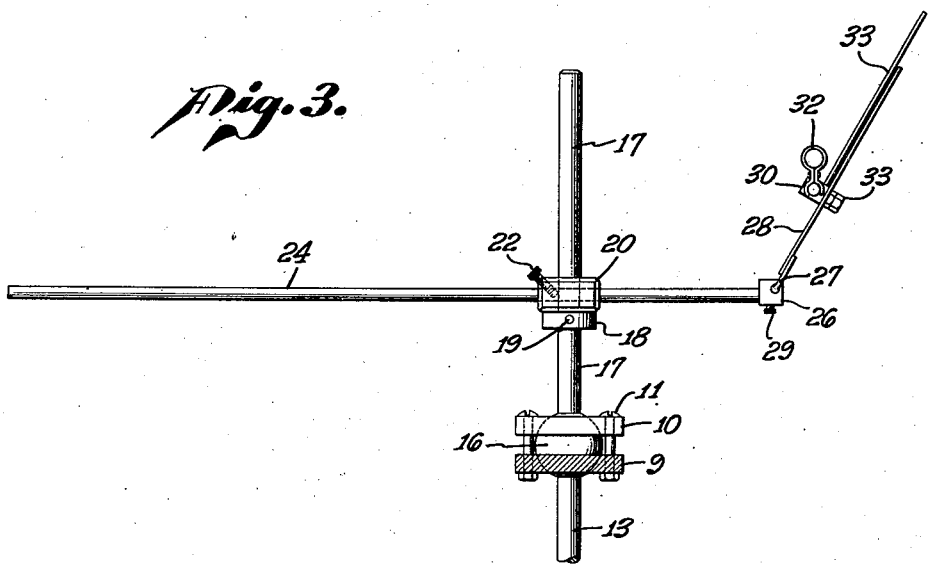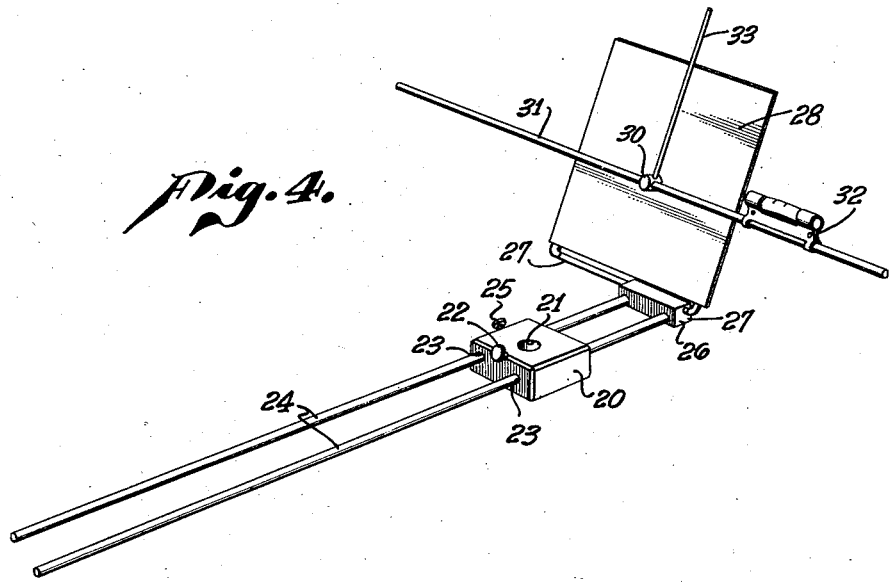

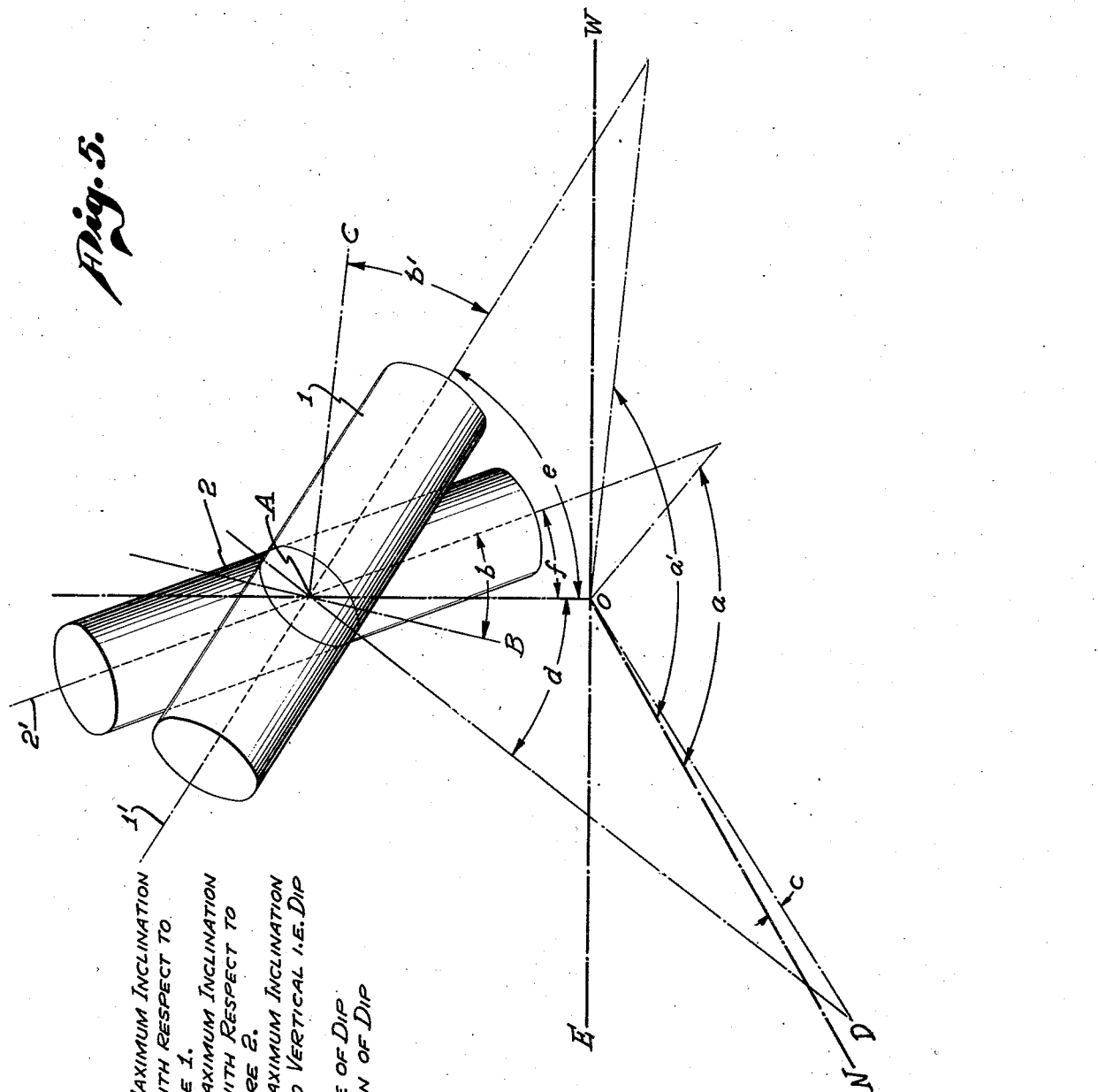

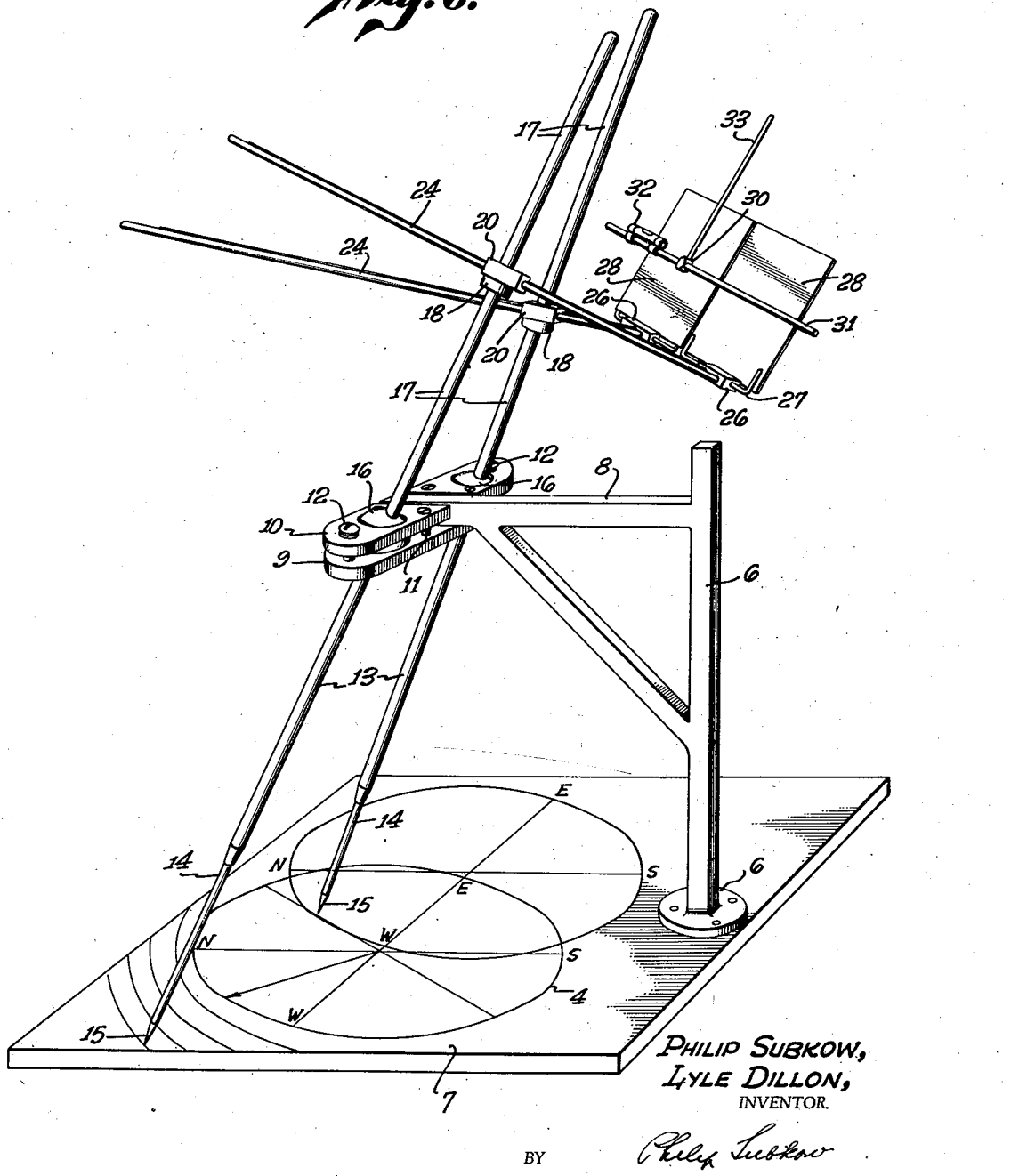

Patented Sept. 5, 1944

2,357,617

UNITED STATES PATENT OFFICE 2,357,617

GEOMETRICAL DETERMINATION OF DIP AND STRIKE OF CORED STRATA

Philip Subkow, Los Angeles, and Lyle Dillon, San Gabriel, Calif.; said Dillon assignor to said Subkow Application February 1, 1943, Serial No. 474,410

9 Claims. (Cl. 33—1)

This invention relates to core orientation, and more particularly to a method and apparatus for the determination of the angle and direction of dip of strata traversed by an earth bore hole. The practical importance of the determination of this information is generally recognized by geologists, petroleum engineers, and mining engineers. Present methods now employed for obtaining this information involve complicated apparatus and costly and tedious observation. We have developed a simple and direct means for obtaining this information.

The principal and preferred embodiment of our invention will be better understood by reference to the accompanying drawings, in which Fig. 1 is an elevation of the apparatus employed by us in the determination of the dip and strike of the strata;

Fig. 3 is a fragmentary cross-sectional detail taken at line 3—3 of Fig. 2, a portion of the apparatus being adjusted to a simulated position of a plane of the core strata;

Fig. 4 is a perspective view of a portion of the apparatus of Fig. 3;

Fig. 5 is a geometrical representation of the principles upon which this method and apparatus are based; and Fig. 6 is a perspective view of the assembled apparatus showing the relative portion of the parts when adjusted for dip determination.

Figure 1:
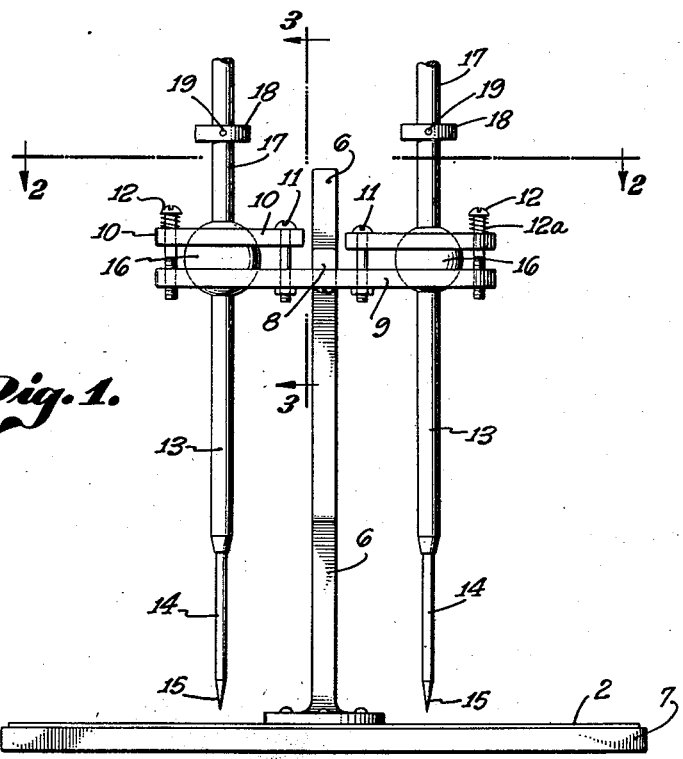

In ordinary core drilling of bore holes, the core which is removed usually shows the strata of the formations which have been cored. Usually these may be visually observed, but if the strata is not visible to the unaided naked eye, the strata may usually be discovered by viewing the core under ultraviolet light issuing from a source, such as a quartz mercury lamp, the light from which has been filtered through a suitable filter which will exclude a major portion of the visible spectrum portion of the light and transmit the deep violet and ultraviolet end of the spectrum. The core will be found to fluoresce at the otherwise invisible surfaces of contact between strata, clearly showing up the strata lines. The thus observed strata may then be traced with pencil, chalk, or other suitable means and its position thus permanently marked on the core. The thus observed stratum usually forms an ellipse where its plane intersects the cylindrical surface of the core, unless, of course as rarely occurs, the core has been taken so that its vertical axis is perpendicular to the plane of the strata. When the core has been marked in the manner hereinbefore described so as to delineate the strata, the angle that its plane makes with the axis of the core is determined in the conventional manner. This determination of the strata angle may be conveniently accomplished, for example, by reflecting the core in a mirror and laying off the reflection of the strata, marking and determining the angle thereof with respect to the vertical axis of the core. The low point on the ellipse is then determined and the line connecting this low point, and the axis positioned vertically is the line of maximum inclination, or the dip of the strata with respect to the core axis. We can also determine this angle by grinding the core to a perfect cylinder and measuring the distance between the high and low point of the ellipse. This distance divided by the diameter of the cylinder is the tangent of the angle of apparent dip. We will call this angle the apparent angle of strata dip of the core.

The angular and azimuthal deviation of the core when it was taken is then determined by taking a survey reading of the bore hole at the point where the core has been removed. Various methods are now commonly employed for this purpose, as will be well understood by those in the art.

In our method we take two or more cores from the same or closely adjacent strata or from strata known to be substantially parallel at the points at which the cores are taken. It is desirable to obtain such cores which are not identical in their angular or azimuthal deviation. We will speak of such cores as "differentially deviated." Thus, if the azimuthal deviations of the bore at the point where the cores are taken are the same, we desire that the inclinations of the bore at those points be different; or if the inclinations are the same, we prefer that the azimuthal deviations be different. Also, both the inclination and azimuthal deviations may be different. These cores preferably may be obtained from the same bore hole or, if unobtainable from the same bore hole, from a plurality of bore holes sufficiently close together to be drilled through the same or substantially parallel strata in a common formation. If they are taken from the same bore hole, it will be found that the normal drilling operations will usually produce cores which are sufficiently "differently deviated" for our purposes. Frequently, moreover, bore holes are deliberately deviated by means of directional drilling, in which case substantial differences in deviation between cores taken from adjacent strata may be produced. Cores obtained under such conditions are particularly applicable in the process of our invention.

The principle of our method will now be more fully understood by reference to Fig. 5 which diagrammatically illustrates the relative positions of the cores in space under the conditions for ascertaining the true dip of the strata. We first establish the co-ordinate system NOWA, where OA is a vertical line to the horizontal plane NOW, which is in turn parallel to the horizontal surface of the earth. N represents north, W represents west. A is the point of intersection of the axis 1' and 2' of cores 1 and 2. Let core 1 and core 2 be two given cores taken from the same or from parallel strata. The angle of dip of the strata A with respect to core 1, i. e., the apparent dip of the strata with respect to core 1, is given by the angle which the line AC makes with a plane perpendicular to the axis 1', i. e., 90°—b'. The angle of dip of the strata A with respect to the core 2, i. e., the apparent dip with respect to core 2, is given by line AE which makes an angle 90°—b' with respect to a plane perpendicular to the axis 2' of core 2. The axis 1' of core 1 has an azimuthal direction shown by angle a'. The inclination from the vertical of the core axis 1' corresponding to the bore hole at the point at which the core is taken is shown by vertical angle e. The position of the core is thus fixed in space except that its angular orientation around its axis 1' as a center of rotation is not yet determined. In other words, the core may take an infinite number of positions, as shown, by rotating core 1 around its fixed axis 1'. Core 2, the second core which has been taken, has its axis directed in the direction shown by angle a. The inclination of its axis from the vertical is shown by the vertical angle f. The position of core 2, then, is similarly fixed in space except for its angular orientation around its axis 2'. In order to fix completely the positions of the cores in space, a third criterion must be satisfied, that is, that the planes of the strata in core 1 and in core 2 be parallel, as they necessarily were in the earth formation from which they were taken. In other words, for convenience of illustration in Fig. 5, the strata of cores 1 and 2 must lie in parallel planes, and in order to accomplish this, cores 1 and 2 must be rotated around their axes 1' and 2' until a common stratum plane is established. When this is done, the orientations of the cores are established and the direction and inclination of the line of maximum inclination of the stratum plane line A—D may then be readily determined. This may be done by establishing a vertical plane DAO passing through the line of maximum inclination of the common stratum plane. The line DO at the intersection of the said vertical plane DAO with the horizontal plane DOW indicates the azimuthal direction c of this line of maximum inclination, i. e., the dip of the stratum. This line may be established by laying off a line in plane A parallel to the plane NOW, i. e., parallel to the earth. This is the strike of plane A. The dip (i. e., the line of maximum inclination) is the line DA in plane A which is perpendicular to the strike. The dip angle is indicated by the angle 90°—d. The position of plane of the stratum, and its dip determined both in direction and amount, is thus established.

Briefly, we may thus fix these parameters of the strata as hereinbefore described by first establishing the inclination of the strata with respect to the vertical axis of each of two or more differently deviated cores taken from said strata or adjacent strata and then establishing the vertical inclination and the azimuthal direction of the vertical inclination of the axis of each of the cores. Finally we may establish the position of the common or parallel strata planes in the cores by rotating the cores about their axes until the planes of the strata in the cores are parallel to each other. All of the original geometrical parameters of the cores are then re-established in space as they were in the earth, and we then can measure the actual direction and angle of dip of the parallel strata planes by establishing the direction of the line of maximum inclination of the strata which will always be perpendicular to the strike.

Conversely, we may establish the inclination and azimuthal orientation of each of the axes of two or more differently deviated cores by determining the true dip, both in angle of dip and direction of dip. This we may do by the methods herein described or by employing any other method, such as magnetic orientation, or by employing electrical coring, or by ordinary geological methods. We will then have established the line A—D both in its azimuthal orientation, angle c, and angle of dip, to wit, the angle 90°—d. We then determine the azimuthal orientation and angular deviation of core 1, and we thus fix the axis of said core in space at said orientation. We also fix the planes of the core strata A so that its known line of maximum inclination is in the direction of dip and at the angle of dip. This we do by rotating the core 1 around its axis 1' until this is accomplished. We then find the direction and inclination of the axis 2', which is necessary to place its core strata A in the plane of the core strata of core 1. This is the desired position of the axis of core 2, both in inclination and azimuthal orientation. We may thus establish the direction and inclination of the axes 1' and 2' of cores 1 and 2 required for the parallelism of their strata or that necessary to make the plane A in both core 1 and core 2 identical. In this manner, having determined the angle and direction of dip of a stratum, we can determine the azimuthal direction and deviation of cores taken from the same or parallel strata without surveying the bore hole.

The above method therefore consists of coring the strata, the dip of which is to be determined, to obtain two or more cores in the strata to be determined or in substantially parallel strata, which cores are differently deviated, determining the azimuthal orientation and angular deviation of the axis of the cores as drilled in the strata, determining the angle of apparent dip of the strata in the cores, and determining the dip of the strata in the earth.

This determination of dip and direction of dip of the strata in the earth may be made mathematically, employing the data of apparent dip and core axes orientation as explained above. It may be done graphically, as illustrated in Fig. 5, by setting up a three co-ordinate system as illustrated therein. We have found it most convenient to make the determination of dip and direction of dip by means of a machine.

Figure 2:
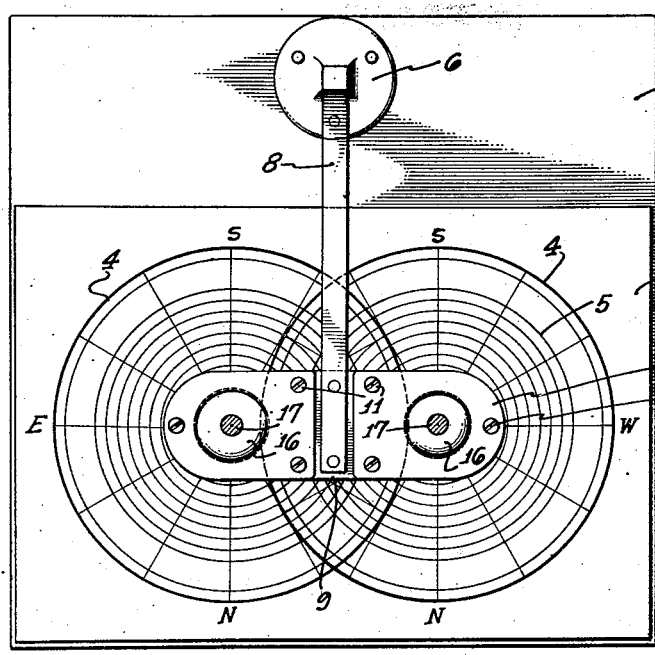
Fig. 2 is a plan-section view of the apparatus taken on line 2—2 of Fig. 1.

While many mechanisms may be developed for the convenient implementation of the methods herein set forth, the mechanism hereinafter described in connection with Figs. 1 to 4, inclusive, and 6 is a very simple and convenient device for carrying out the process of our invention. The geometric core orienter shown in Figs. 1 to 4, and 6 consists of base 7 upon which is positioned two polar co-ordinate graphs 3 and 4 inscribed on chart 2. These polar co-ordinates show north, south, east, and west directions, and are provided conveniently with 360° divisions, reading clockwise, north being 0–360°. Concentric circles are also inscribed to show angular deviation from the vertical, as will hereinafter be described. Upon this base 7 is a stand 6 carrying a cross arm 8 upon which is mounted a horizontal bracket 9 carrying adjacent its opposite ends two universal ball joints 16. These ball joints are frictionally and adjustably held in place by means of plates 10 fixed by bolts 11 and an adjustable screw 12 acting against a spring 12a. Diametrically through each of the ball joints a tube 13 extends in which is telescopically retained a rod 14 terminating in a point 15. Rods 17 extend coaxially in line with the tube 13 and carry movable collars 18 which may be fixed in position by set screws 19. The centers of the universal ball joints 16 are on a line parallel to the base 7 and are so positioned and so spaced horizontally that their centers are in perpendicular lines extending through the center of each of their respective polar co-ordinate charts. The concentric circles of the charts are so spaced that they may represent equal angular deviations of the rod 13 from the vertical. Thus (see Fig. 6), by moving the points 15 to any one of the concentric circles and to any one of the radii of the charts, the direction and inclination of the rods may be established. Slidably and rotatably placed on each rod 17 so as to rest on collar 18 is a block 20, as best shown in Fig. 3, carrying a central hole 21 vertically bored therethrough. The rod 17 may be passed through the hole 21, as shown, and a set screw 22 is provided to lock the block against rotation. Through the block 20 two parallel holes are drilled perpendicular to the axis of the hole 21. Through these holes two rods 24 are slidably supported. A set screw 25 is provided to lock one of these rods in the block to prevent the sliding of the rods through the block. The rods are fixed at one end in a block 26. Through the block 26 is bored a hole 27 which is perpendicular to both the axis of the bore 21 and to the axes of the rods 24. Through this hole 27 is passed a rod 27' adapted to slide and rotate therein in the manner of a hinge. A set screw 29 is provided to fix the rod in any desired position. Upon this rod is positioned a plane member 28. A hole is provided in the central portion of the plane member through which is passed a boss 30 carrying a rod 31 which in turn carries a spirit level 32 and a rod 33 set perpendicular to rod 31. The rod may be frictionally or pivotally secured to the plane 28 by means of screws 33'. One assembly, as shown in Fig. 4, is mounted on each of the rods 17 (see Fig. 6). The common axes of each of the coaxial tubes 13, rods 14, and rod 17 represent the axis of each of the two cores, shown at 1 and 2 in Fig. 5.

The plane member or plate 28 represents the plane of the core strata in each of the cores. We will term this plane the "simulated core stratum plane." The operation of the device is as follows.

Screws 33' are loosened and the rod 31 and boss 30 are removed from the plate 28. The assembly is then positioned, as shown in Fig. 3, by loosening the set screw 22 and fixing the set screw 19. We then loosen the set screw 29 and prearrange each of the rods 13 so that each point 15 is directly over the center of its corresponding polar co-ordinate chart. The rods 13, 14, and 17 are then vertical and the rods 24 are parallel to the base 7. We then set the inclination of the simulated strata planes 28 with respect to the axes of the rods 17 to that of the apparent angles (90—b) and (90—b') the apparent dip of the core stratum, which has been previously determined as hereinbefore described.

Let us now assume that the left-hand one of the rods 13 represents the axis of core 2 and the right-hand one of the rods 13 represents the axis of the core 1, as shown in Fig. 5. We therefore set the angle of the plane 28 positioned on the left-hand rod 17 at (90—b) with respect to the axes of rods 24 and we tighten the set screw 29 to hold it in place. We next set the angle of the right-hand plane 28 similarly at (90—b') and tighten the set screw 29 to hold it in place. We then move the point 15 of the left-hand rod 13 until it shows an azimuthal direction equal to angle a (see Figs. 5 and 6) and a vertical inclination equal to angle f. This we do by moving the point to the radius representing the azimuthal deviation a and to the concentric circle representing the angular inclination f. In like manner we move the point 15 of the right-hand rod 13 until it has reached the radius representing the azimuthal deviation a' and to the concentric circle representing the vertical inclination e (Figs. 5 and 6). We then rotate the block 20 carrying rods 24 around the rod 17 and move the rods 24 axially to and fro until by trial and error we have superimposed the two planes 28, one upon the other, under which conditions the planes of plate 28 will obviously be parallel (see Fig. 6). Another convenient method is to set the plane parallel and by trial and error determine the position at which the blocks 20 of both planes fit over the respective rods 17.

We then lock the blocks 20 in place around their respective rods 17 by tightening the set screw 22 and we lock the rods 24 in each block 20 in place by tightening the set screws 25. We have thus established the common strata plane of the two cores. To determine the direction of the dip of the strata and its inclination, we replace one of the rods 31, whichever is conveniently placed for this purpose, in one of the plates 28 in the central hole provided therefor and move the rod 31 around the axis of the boss 30 until the spirit level shows that the rod is level, i. e., parallel to the earth. We then lock the rod in place by tightening the screws 33. This line, i. e., the axis of rod 31, is therefore the strike of the plane. The direction of the rod 33, which represents a line in plane 28, perpendicular to the axis of the rod 31 measures the direction of this line, going-down dip, and its inclination. This will be the direction and inclination of the dip of the strata. To determine this direction we may proceed in one of the following manners.

We may orient the instrument so that north on the chart actually points to true north. We can then measure the direction of dip given by the line perpendicular to the strike rod 33, i. e., the dip by means of a compass. We may also, if we desire, accomplish the same result without actually orienting the instrument by projecting the line representing the dip of plane 28 onto the chart 2, and determine the direction of that projection by drawing a line parallel thereto through the center of the polar co-ordinate chart. We may also project the strike plane 28 onto chart 2 and pass a line perpendicular to the projection and going-down dip through the center of chart 2, and thus establish the direction of dip without orienting the instrument.

The same instrument will permit us to determine the azimuthal direction and inclination of a bore hole from which a core has been taken knowing only the direction and inclination of the dip of the strata from which the core has been taken and the orientation of a core taken from a parallel or the same strata. To obtain this information we proceed in the following manner:

We set the rods 17 vertically and establish the simulated planes 28 to the apparent angle of dip of the strata for each core. We lock the planes in place by set screws 29. We set the rod on either the left-hand or right-hand side, say that it is the left, so that its inclination and orientation are that of the known core. We then position the simulated plane 28 associated with that rod so that the line drawn perpendicular to the strike (i. e., rod 33 perpendicular to the rod 31 in its level position) is in the direction of the dip and we lock the lock block 20 in this position. Then we manipulate the rod 13 on the right-hand and rods 24 on each block so that the planes are parallel. We read the azimuthal direction and inclination of the right-hand rods 13 and 14. This is the inclination and the azimuthal direction of the bore hole through which the unknown core has been taken.

The foregoing is merely illustrative of a preferred method and embodiment of the invention, and is not to be considered limiting since many variations may be made by those skilled in the art within the scope of the appended claims.

We claim as our invention:

1. A method of determining the dip of strata in a structure which comprises, taking a plurality of differently deviated cores from the same or substantially parallel strata in said structure, determining the inclination and the azimuthal direction of the inclination of the axes of said cores, establishing the apparent angle of dip of the core strata in each of said cores with respect to their axes, and determining the true dip of a plane parallel to said core strata when said core axes are established in space at their respective azimuthal deviations and inclinations.

2. A method of determining the dip of strata in a structure which comprises, taking a plurality of differently deviated cores from the same or parallel strata, determining the azimuthal orientation and inclination of the bore hole at the points at which said cores are taken, establishing the apparent dip of the core strata of each of said cores with respect to the core axes, and determining the true direction of dip of a plane passed parallel to each of said core strata when the axes of said cores are oriented in direction and inclination to simulate that of the bore hole at the points where said cores are taken.

3. A method for the determination of the dip of strata in a structure which comprises, taking a plurality of differently deviated cores through the same or parallel strata, determining the azimuthal and angular deviation of the bore hole at each of the points at which said cores have been taken, determining the inclination of the core strata to their respective core axes, positioning lines in space at the azimuthal orientation and inclination of said bore holes, establishing a plane in space for each of said lines having an angle of inclination to said line equal to the inclination of the respective strata in their respective cores, rotating said planes around their respective lines on a radius perpendicular to their respective core lines to superimpose said planes, and establishing a line on said plane parallel to the earth and determining the direction of dip as the direction of a line drawn on said planes perpendicular to said last-named line, determining the angle of dip as the angle of that said perpendicular line makes with a horizontal plane parallel to the earth.

4. An apparatus for the determination of the dip and strike of strata which comprises, a rod, means for fixing said rod in desired compass direction and at a desired angular inclination with the vertical, a plane, means for mounting said plane on said rod, means for adjusting said plane to desired inclination to said rod, means for rotating said plane around said rod, a second rod, means for fixing said second rod in desired compass direction and at desired angular inclination from the vertical, a second plane, means for mounting said second plane on said second rod, means for adjusting said second plane to desired inclination to said second rod, and means for rotating said second plane around said second rod, and means for superimposing said planes.

5. An apparatus of the class described which comprises, a pair of rods universally hinged at one end of each rod, blocks slidably placed on said rods, means for fixing said blocks in desired position on said rods, other rods passing through said blocks, said other rods being placed perpendicular to the first-named rods passing through said blocks and said other rods being slidably positioned in said blocks, and a plate mounted on each of said other rods and hingedly mounted thereon.

6. A method for determining the dip of a stratum in a structure, which comprises taking a plurality of cores of unlike orientation in space when taken in a bore hole, determining said orientations in said bore hole, establishing a plane in space having an inclination to a vertical axis equal to the inclination of the core stratum in one of said cores to the axis of said core, orienting said vertical axis to simulate the orientation of said core in the bore hole from which said core is taken, establishing another plane in space having an inclination to a vertical axis equal to the inclination of the core stratum of another of said cores to the axis of said core, orienting said vertical axis to simulate the orientation of the axis of said other core when said other core is taken, rotating said planes around said oriented axes, and determining the dip and strike of a plane which will be parallel to both of said planes.

7. A method for determining the dip of strata in a structure, which comprises taking a plurality of cores of unlike orientation in space as taken in said bore hole, determining said orientations of said cores, determining the angle of inclination of a core stratum in each of at least two cores to the axes of said cores, determining the dip of a plane in space which will bear an angular relation to the vertical axes of said cores, when such cores are oriented as taken in said bore hole, which angular relation is equal, in the case of each core, to the angle that the core stratum of said core bears to the axis of said core.

8. An apparatus for the determination of the dip and strike of strata, which comprises a plurality of planes, means for inclining each of said planes to a separate vertical axis, means for inclining each of said axes to any desired angular degree and in any direction, means for separately rotating said planes around each of their respective axes, and means for determining the dip and strike of said planes when rotated around said axes.

9. A method for determining the dip of a stratum in a structure, which comprises taking a plurality of cores of unlike orientation in space when taken in the bore hole, determining said orientations in said bore hole, determining the angle of inclination of the core stratum in each of said cores to the axes of said cores, determining the dip and strike of the plane which will have an angular inclination to each of two lines having a bearing and vertical inclination to simulate the orientation of said cores when taken in said bore hole, which angular inclination to each line is equal to the inclination of the core stratum in each of said cores to the respective axes of each of said cores.

PHILIP SUBKOW.
LYLE DILLON.